US011230093B2

(12) United States Patent
Zeman et al.

(10) Patent No.: US 11,230,093 B2
(45) Date of Patent: Jan. 25, 2022

(54) ANTI-BOUNCE PRINT DECK FOR FLEXOGRAPHIC PRINTING PRESS

(71) Applicant: Paper Converting Machine Company, Green Bay, WI (US)

(72) Inventors: Dale E. Zeman, Denmark, WI (US); Jordan W. Koplien, De Pere, WI (US); James J. Kaye, New Franken, WI (US); Randall L. Heyrman, Oneida, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 196 days.

(21) Appl. No.: 16/381,097

(22) Filed: Apr. 11, 2019

(65) Prior Publication Data
US 2019/0337286 A1 Nov. 7, 2019

Related U.S. Application Data

(60) Provisional application No. 62/666,274, filed on May 3, 2018.

(51) Int. Cl.
*B41F 13/32* (2006.01)
*B41F 13/38* (2006.01)
*B41F 5/24* (2006.01)

(52) U.S. Cl.
CPC .............. *B41F 13/32* (2013.01); *B41F 5/24* (2013.01); *B41F 13/38* (2013.01)

(58) Field of Classification Search
CPC .......... B41F 13/20; B41F 13/26; B41F 13/30; B41F 13/32; B41F 13/34; B41F 13/24; B41F 13/085; F16C 2324/16; F16C 2229/00; F16C 35/077; F16C 13/02
See application file for complete search history.

(56) References Cited

U.S. PATENT DOCUMENTS

| 4,905,598 A * | 3/1990 | Thomas ................... D21F 3/06 101/219 |
| 5,630,364 A * | 5/1997 | Koura ...................... B41F 13/20 101/216 |
| 6,142,073 A | 11/2000 | Zeman et al. |

(Continued)

FOREIGN PATENT DOCUMENTS

WO     2011064129 A1    6/2011

OTHER PUBLICATIONS

International Search Report and Written Opinion for PCT/US2019/026881 dated Aug. 9, 2019.

*Primary Examiner* — Leslie J Evanisko
*Assistant Examiner* — Leo T Hinze
(74) *Attorney, Agent, or Firm* — Thompson Coburn LLP

(57) ABSTRACT

A device and a method is disclosed to maintain plate and anilox mandrel position stability in print decks of a flexographic printing press. In one aspect, the mandrel bearings associated with at least one of the plate roll and the anilox roll are preloaded for the purpose of eliminating backlash and increasing the positional stiffness of the bearings, and thus the mandrel. In another aspect, the roll drive motor control system is enabled to provide a torque additive command the torque profile to maintain rotational consistency and otherwise overcome torque transients experienced by the motor during print bounce. Accordingly, the problem commonly referred to as print bounce and or print banding is alleviated.

19 Claims, 8 Drawing Sheets

(56) References Cited

U.S. PATENT DOCUMENTS

| | | | |
|---|---|---|---|
| 6,176,181 B1 | 1/2001 | Van Ryzin et al. | |
| 8,418,610 B2 * | 4/2013 | Schafer | B41F 13/085 101/216 |
| 2001/0042466 A1 | 11/2001 | Forch | |
| 2007/0295230 A1 | 12/2007 | Christel et al. | |
| 2009/0085507 A1 * | 4/2009 | Quan | B41F 13/0045 318/601 |
| 2014/0161383 A1 | 6/2014 | Rothaug | |

\* cited by examiner

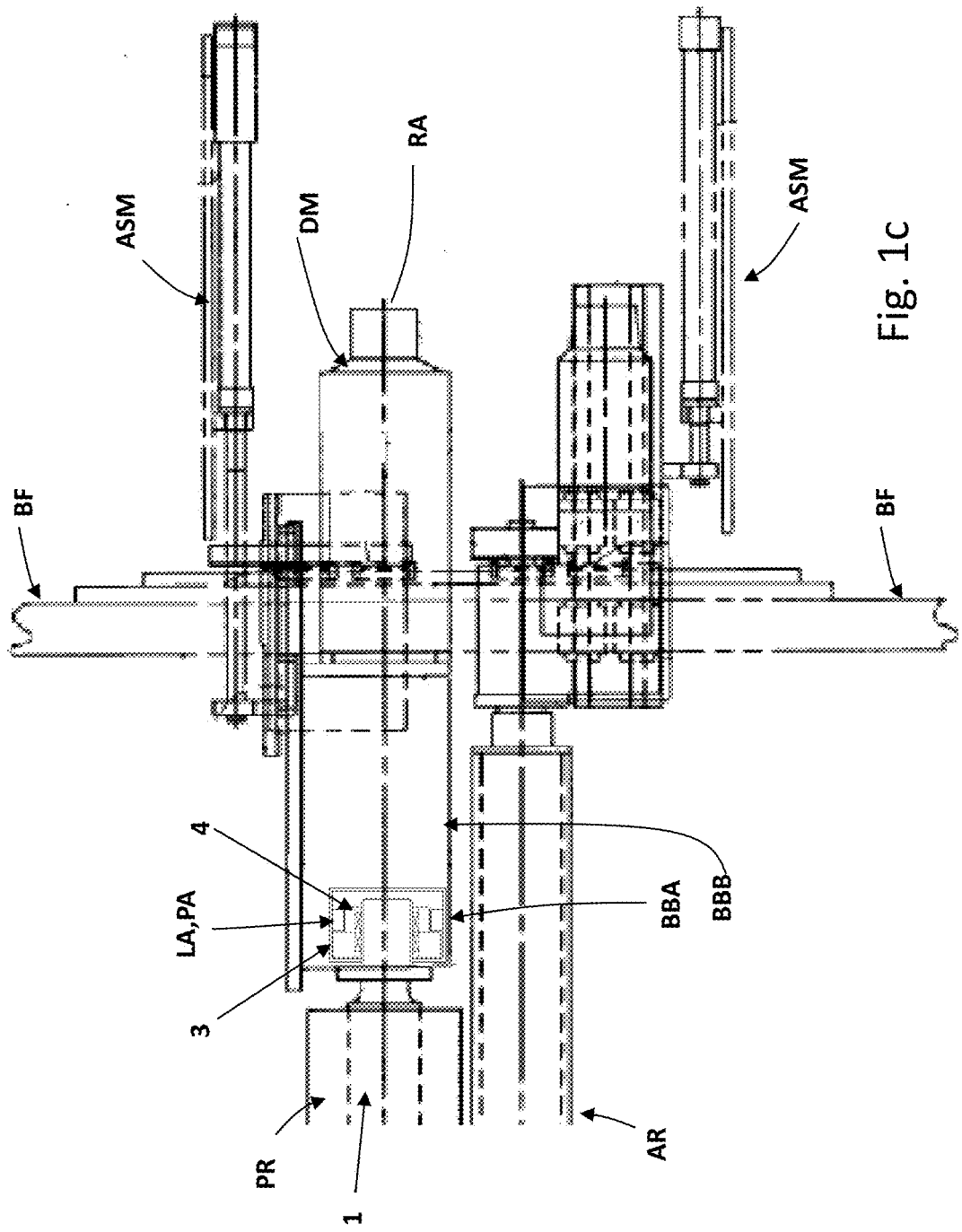

ANTI-BOUNCE PRINT DECK FOR FLEXOGRAPHIC PRINTING PRESS

RELATED APPLICATION DATA

This application claims the benefit of U.S. provisional application Ser. No. 62/666,274, filed May 3, 2018, the disclosure of which is incorporated by reference herein.

BACKGROUND

A typical in-line or central impression flexographic printing press has: an unwinder, a print area comprised of an impression roller and ink application rolls, a drying system, and a rewinder. The ink application rolls are commonly known as plate and anilox rolls. These rolls or sleeves are supported the full width of the press by mandrels. On an in-line press, each print deck will typically have one impression roll, one plate mandrel, and one anilox mandrel. On a central impression press, each print deck will have one plate mandrel, one anilox mandrel, and will have a single impression roll for the entire press. Typically, both in-line and central impression presses will have 10 print decks but this number can vary according to customer preferences.

U.S. Pat. Nos. 6,142,073 and 6,176,181, which are incorporated by reference herein, describe a typical arrangement of the rolls provided in a printing deck. In U.S. Pat. Nos. 6,142,073 and 6,176,181, the plate roll and/or anilox roll may be axially shifted to allow changeover of the roll. The general description of print deck and terminology set forth in U.S. 6,142,073 and U.S. Pat. No. 6,176,181 is used in the description that follows.

Print bounce and print banding are common problems that occur during the flexographic printing process. Bounce and banding are typically the result of a printed image in the plate that has a hard line in the cross web direction. This hard line causes the plate and anilox mandrels to move away from their normal rotation causing inconsistent print. A second problem with the hard line is a torque spike or transient to the mandrel drive system and motor, which can cause inconsistent rotation resulting in print banding.

The most common method of reducing the effects of print bounce and banding is stiffening the mandrel roll body. The most common method of stiffening the roll body is to use a composite material for the mandrel. While the use of a composite material for the mandrel does reduce the effects of print bounce and banding, it does not eliminate it completely.

Mandrels for the plate and anilox rolls are typically supported by a single front bearing or two front bearings held rigidly in a common bore. In both cases of a single front bearing or a two front bearing arrangement, the bearing(s) typically has an inner race that is rigidly attached to the front of the mandrel. The outer race and roller bearings are held in a support carriage. The carriage moves linearly to adjust for print position relative to the repeat size of the print plate. During print job change-overs, the front bearing is axially removed from the mandrel to allow the plate and anilox sleeve to be removed and replaced.

A second function of the front plate mandrel bearing is to allow on-the-fly mandrel side shifting. This side shifting is typically done at the beginning of a new print job. To align all printed images in the cross web direction, the rear mandrel support has a rail set-up in the cross machine direction.

Typically, the front mandrel bearings require internal clearances to allow mandrel side shifting and front bearing removal for sleeve change. The internal clearances required for such side shifting and front bearing removal magnify problems associated with print bounce and print banding.

SUMMARY

The focus of this disclosure is the elimination of print bounce and banding that is associated with mandrel support bearings or mandrel drive motors. As will become evident from the description that follows below, unwanted mandrel movement may be reduced by using two adjacent mandrel bearings. The bearings may be radially loaded in opposite directions to remove backlash and increase the mandrel stiffness. This radial loading may be accomplished by: (i) providing a stationary bearing mounted directly in mandrel support carriage and a second bearing mounted in a floating housing that is loaded against the stationary bearing with a lever actuator; or (ii) providing a stationary bearing mounted directly in mandrel support carriage and a second bearing mounted in a pivoting housing that is loaded against the stationary bearing with a spring actuator.

The amount of radial loading is adjustable to gain maximum mandrel stability and maximize print quality. The adjustment may be done by rotating a setscrew that is attached to the lever actuator or by adjusting the amount of compressive force delivered by the spring actuator against the pivoting housing.

Additionally, the radial bearing load may be removed when desired for instance, when axially removing the bearing supports during sleeve change over. This may be accomplished by: (i) positioning the setscrew on the lever actuator to unload the floating housing when the carriage lock is disengaged; or (ii) moving the pivoting housing to a position that overcomes the load force applied by the spring actuator.

To further minimize printing errors, a control system for the roll drive motors may be provided. An unwanted side effect of print bounce is the additional electronic error created from the disturbance. To help minimize this error, a torque feed-forward control system may be implemented to help suppress the disturbance generated from the bounce. This control system first captures the torque profile over a single revolution of the printing cylinder during set-up. Utilizing this torque profile, the control system may be configured to apply the appropriate additive torque command based upon the feedback position of the roll. The control system may apply the appropriate additive torque command before the disturbance, and any error may be effectively minimized.

BRIEF DESCRIPTION OF THE DRAWINGS

FIG. 1c is partial top view of a back frame of the deck of the press showing the plate roll and anilox roll with plate roll shifted axially and the mandrel of the plate roll engaged in a bearing assembly similar to that shown in FIG. 1a.

FIG. 2 is an end view schematic diagram of a lever actuator for radially loading a second bearing support of the bearing assembly of FIG. 1a.

FIG. 3 is an end view schematic diagram of a pivot actuator for radially loading the second bearing support of the bearing assembly of FIG. 1a.

DETAILED DESCRIPTION

Figure 1A:
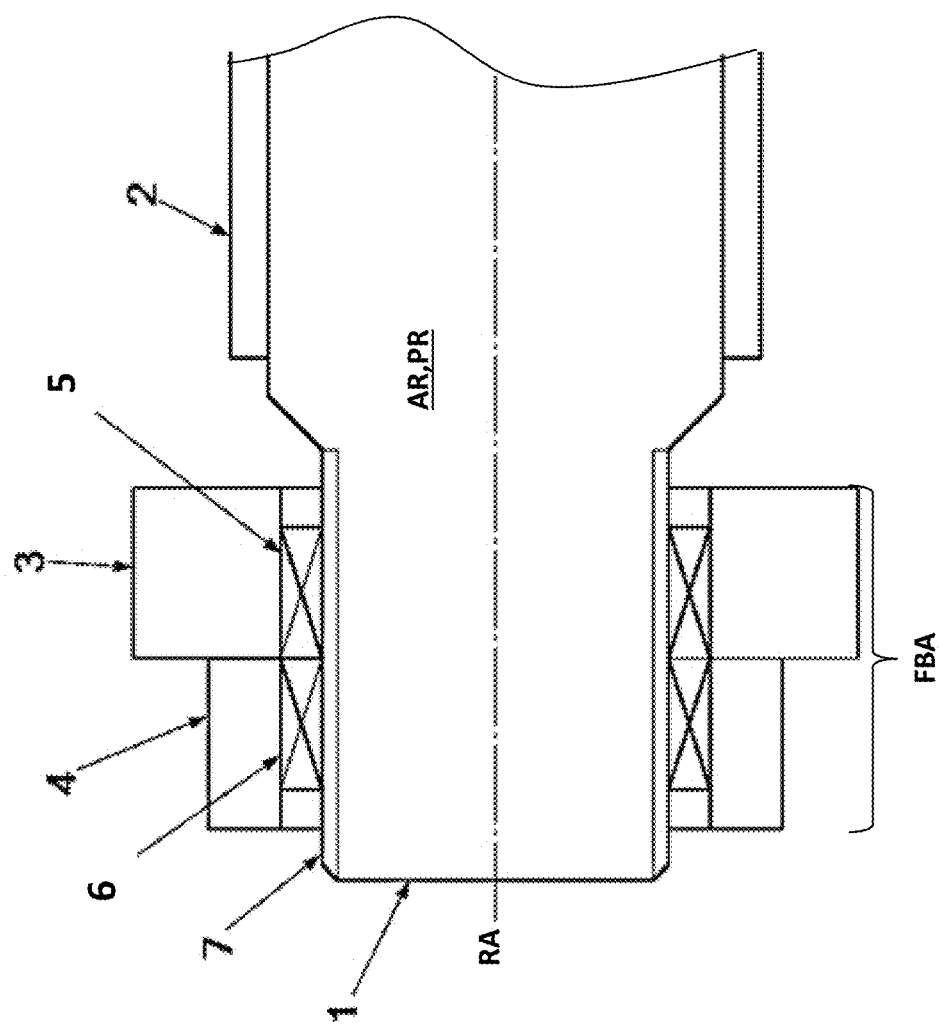
FIG. 1a is a cross-sectional view of a mandrel for an anilox roll or plate roll engaged in an exemplary bearing assembly of a deck of a press.
Figure 1B:
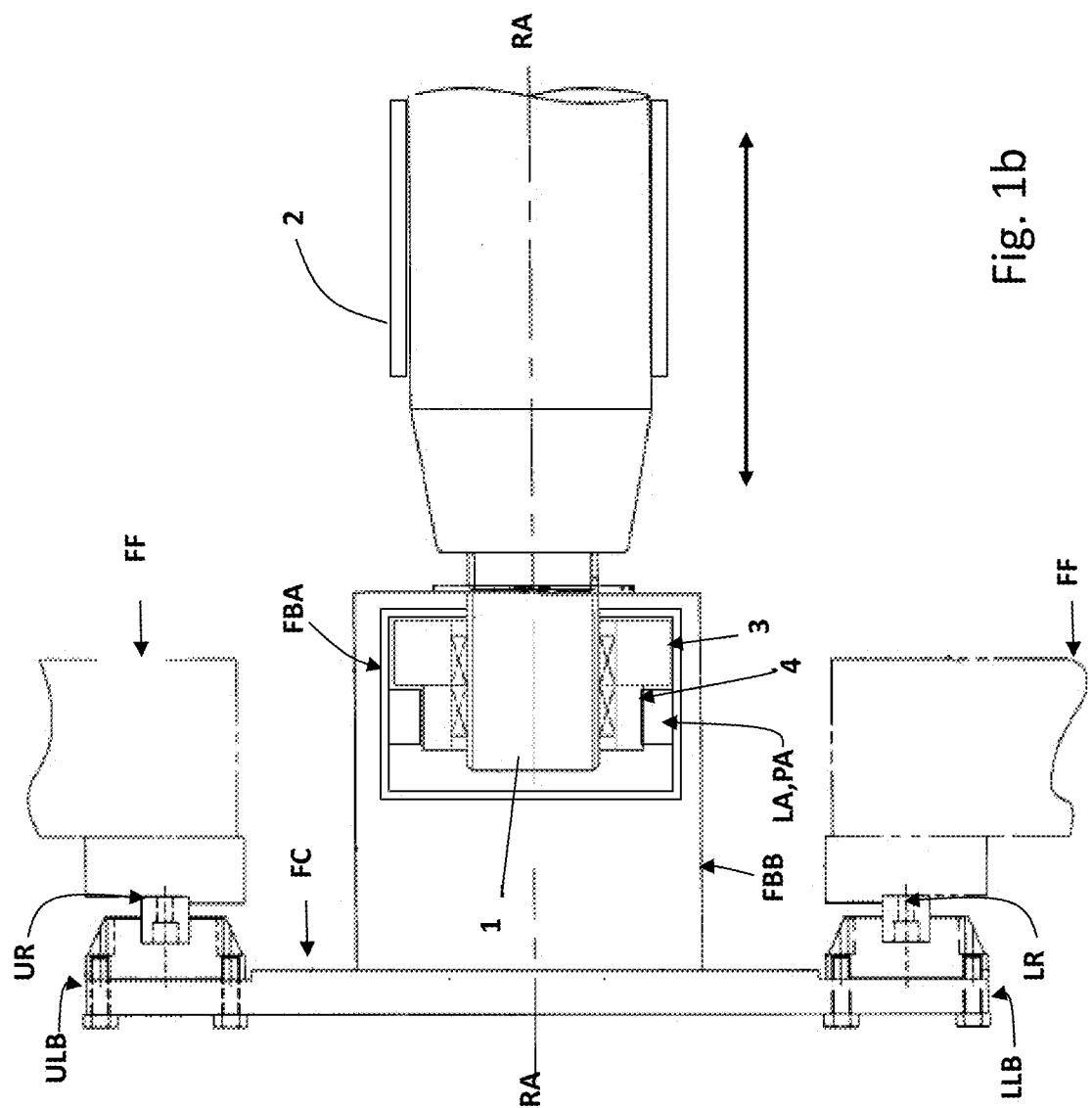
FIG. 1b is a partial side view of a front frame of the deck of the press with a mandrel engaged in a bearing assembly as shown in FIG. 1a wherein the mandrel may be for both a plate roll and anilox roll.

By way of example and not in any limiting sense, as described in U.S. Pat. Nos. 6,142,073 and 6,176,181, the printing press may have front and back frames FF,FB, and anilox rolls AR, and plate rolls PR extending between the frames for each deck. An ink fountain (not shown) on the deck supplies ink to the anilox roll AR, and the anilox roll transfers the ink to the plate roll PR. The plate roll PR prints an image on the web as the web is moved past the plate roll. Both the anilox roll AR and the plate roll PR have a center axis RA along their lengths and include a front end which is rotatably supported in a front bearing assembly FBA and a back end which is rotatably supported in a back bearing assembly BBA. Each of the front and back bearing assemblies FBA,BBA for each roll AR,PR may be mounted in a corresponding bearing block FBB,BBB. Thus, each deck may include a plate roll and an anilox roll, each of which may be supported by bearing blocks FBB,BBB that in turn may be operatively mounted to the front and back frames FF,BF of the press in a manner to allow the rolls to shift axially in the direction of the roll axis RA for sleeve change out, and roll maintenance and removal, as needed.

The front bearing assembly FBA for each roll AR,PR may be mounted to a front bearing block FBB, which is attached to a front carriage FC. Upper and lower linear bearings ULB,LLB may be attached to the front carriage FC, and the upper and lower linear bearings ULB,LLB may be slidably mounted on parallel spaced-apart upper and lower linear rails UR,LR of the front frame FF. The front carriage FC may move in a direction perpendicular to the roll axis RA to allow access to the sleeve and sleeve removal after the roll has been axially shifted and withdrawn from the front bearing assembly FBA.

The back end of the roll is rotatably supported by a back bearing assembly BBA in a back bearing block BBB, which is connected to the back frame BF. The back bearing assembly BBA for each roll AR,PR may be mounted to a back bearing block BBB which is attached to a bracket that is adjustably and operatively connected to the back frame BF. The rolls may be driven by a drive motor DM. The back bearing block BB for each roll AR,PR may be mounted on an axial shift mechanism ASM, which shifts the back bearing block BBB and the corresponding roll in the axial direction of the roll axis RA. The back bearing block BBB and drive motor DM may be supported by the bracket, and the bracket may be slidably mounted by linear bearings on rails which extend parallel to the center axis RA of the roll. The rails may be supported by the back frame BF. The bracket and the corresponding roll may be shifted forwardly and backwardly in directions parallel to the axis RA of the roll by a linear actuator of the axial shift mechanism ASM. The linear actuator may extend between the bracket and the back frame. The drive motor DM may move with the bracket via the linear actuator. While the drawings show an axial shift mechanism ASM for the rolls, the axial shift mechanism may be omitted. Additionally, while the drawings show a multi-deck printing press, the principles of the disclosure may also be used with other types of presses and can be used on presses which have only one print deck.

For purposes of ease of illustration, FIG. 1a presents the front bearing assembly FBA for the mandrel 1 which may be for either the plate roll PR or the anilox AR, and the front bearing block FBB has been omitted. The back bearing assembly BBA for the mandrel may have a similar configuration and is not shown for the sake of brevity. As discussed above, the mandrel 1 may comprise a round shaft type component which supports a corresponding plate or anilox sleeve 2 with the plate or anilox sleeve mounted on mandrel.

Figure 2:
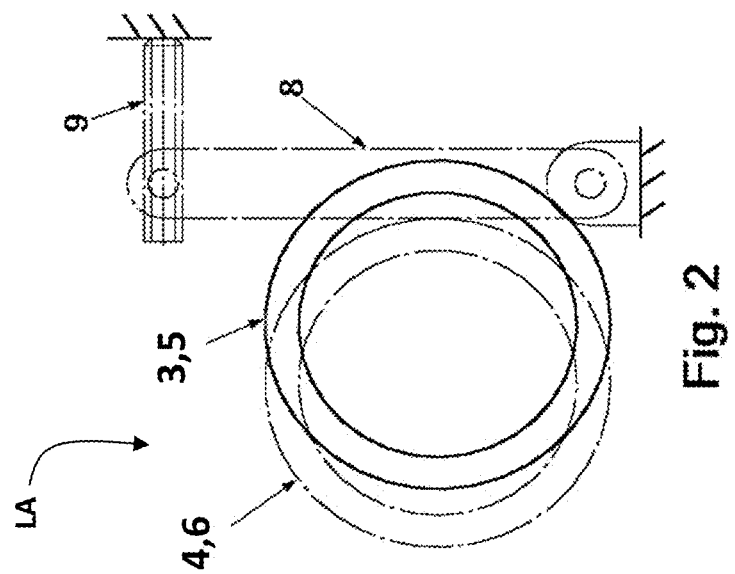
Figure 3:
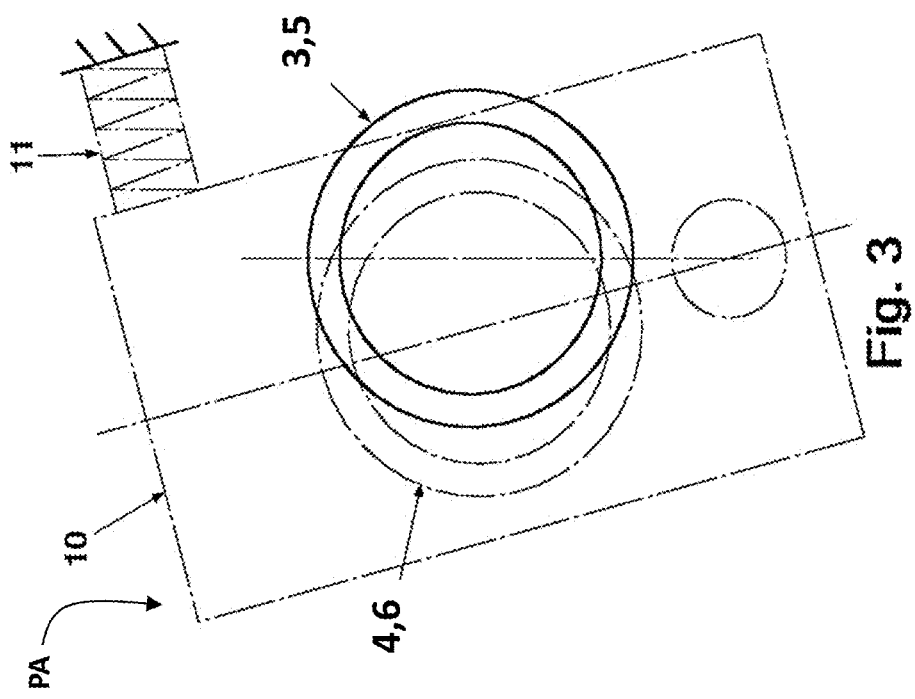

Referring to FIG. 1a, the bearing assembly (e.g., the FBA,BBA) comprises a first bearing support 3 and a second bearing support 4. The first bearing support 3 may be a roller bearing and may be rigidly mounted to the respective bearing block (for instance, the front bearing block FBB or back bearing block BBB). As described in the example above, the respective bearing block (e.g., FBB,BBB) is directly connected to linear slides and ball screw positioning devices, for instance, those of the type set forth in U.S. Pat. Nos. 6,142,073 and 6,176,181. In the bearing assembly FBA,BBA, the second bearing support 4 may be disposed adjacent to the first bearing support 3. The second bearing support 4 may also comprise a roller bearing. Rotational elements 5,6 may be disposed between the correspond bearing supports 3,4, and a hardened inner race 7, which may be rigidly attached to or integral with the mandrel 1. While the drawings show a continuous race for the rotational elements 5,6 of the first and second bearing supports 3,4, a separate inner race may be provided for the rotational elements for each bearing support. The first bearing support 3 may be positioned relative to the center axis RA of the mandrel to provide minimal radially loading for the first bearing support. The second bearing support 4 may be positioned relative to the center axis RA of the mandrel to provide a selected desired level of radial loading for the second bearing support. As described below, the second bearing support 4 may be locked into place with a selected desired radial load by use of a lever actuator LA as shown in FIG. 2, or a pivot actuator PA as shown in FIG. 3. The radial loading applied to the second bearing support 4 may generate a radial load on the first bearing support 3. The radial loading of the second bearing support 4 may be opposite of the radial loading applied first bearing support 3 to the extent the first bearing support is radially loaded. As will be explained below, the second bearing support 4 is allowed to float during removal and/or replacement of the sleeve 2 associated with the corresponding plate roll PR and anilox roll AR, or removal of the roll AR,PR and/or mandrel 1 for maintenance or replacement. During sleeve or roll changeover, the radial loading of the second bearing support 4 may be released, as desired. For instance, for sleeve removal, the radial loading of the second bearing support 4 of the front bearing assembly FBA may be released, but the radially loading of second bearing support of the back bearing assembly BBA may not need to be released, in distinction to roll changeover, which will require that the radial loading of the second bearing support 4 of the front bearing assembly FBA and back bearing assembly BBA to be released. In releasing the radial loading of the second bearing support 4, the corresponding first bearing support 3 may return to a neutral loading to allow the first bearing support to be removed axially from the end of the mandrel for sleeve or roll changeover.

Referring to FIG. 2, the first bearing support 3 may be mounted rigidly in the corresponding bearing block (e.g., FBB,BBB). The second bearing support 4 may be moved to its preload location to provide the selected desired level of radial loading with a lever actuator LA. The lever actuator may comprise a lever 8 arranged to apply a force to the second bearing support 4 and its corresponding rotational elements 6. A setscrew 9 may be provided to adjust the amount of force to be applied by the lever 8. A spring actuator may also be provided with or without the setscrew.

Referring to FIG. 3, the first bearing support 3 may be mounted rigidly in the corresponding bearing block (e.g., FBB,BBB). The second bearing roller bearings 6 may be moved to preload location in pivoting or arcuate manner to provide the selected desired level of radial loading with a pivot actuator PA. The pivot actuator may comprise a pivot housing 10 arranged to apply a force to the second bearing support 4 and corresponding rotational elements 6 and provide the selected desired amount of radially loading. An adjustable spring actuator 11 may be provided to apply force to the pivot housing 10. A setscrew may also be provided with or without the spring actuator.

Figure 4:
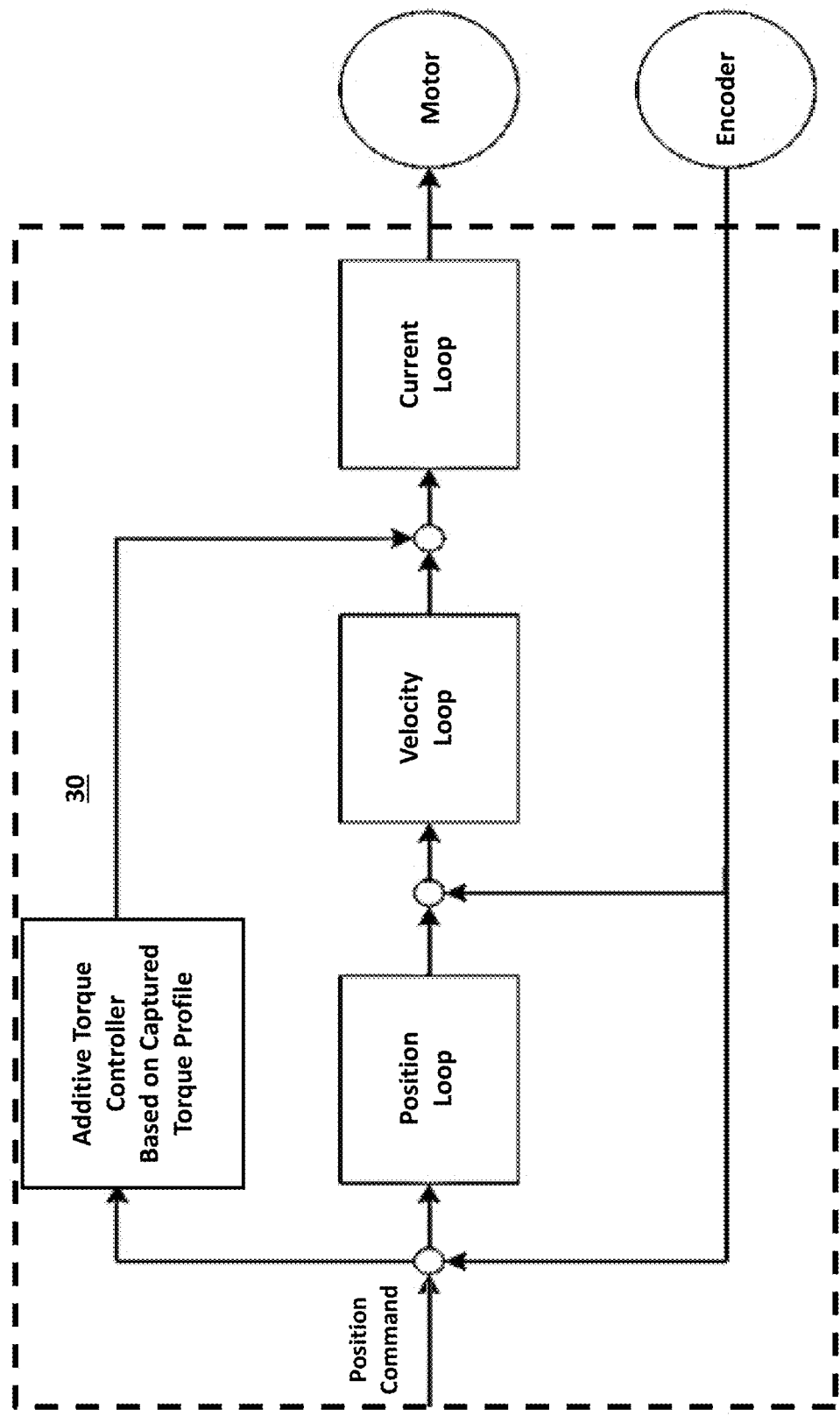
FIG. 4 is a control diagram for an exemplary control of a drive of a motor of an exemplary roll.

Referring to FIG. 4, a control 30 is presented which may be used with the drive of the drive motor DM for at least one of the rolls AR,PR. The control 30 may be configured to develop a torque profile to compensate for torque transients that may be caused by the plate roll PR or anilox roll AR during rotation. An encoder coupled to the drive motor DM may provide rotational position information of the roll to the control 30. The control 30 may be programmed to determine the rotational position of the roll AR,PR relative to any torque transient caused by a hard line in a printing plate or other periodic disturbance. During set-up, the position of any transient may be determined and provided to the control 30. The control 30 may be programmed to apply an additive torque command to the motor control signal to increase the torque prior to the disturbance thereby minimizing the effects of any transient otherwise caused by the hard line and/or periodic disturbance, thereby minimizing print bounce.

Figure 5:
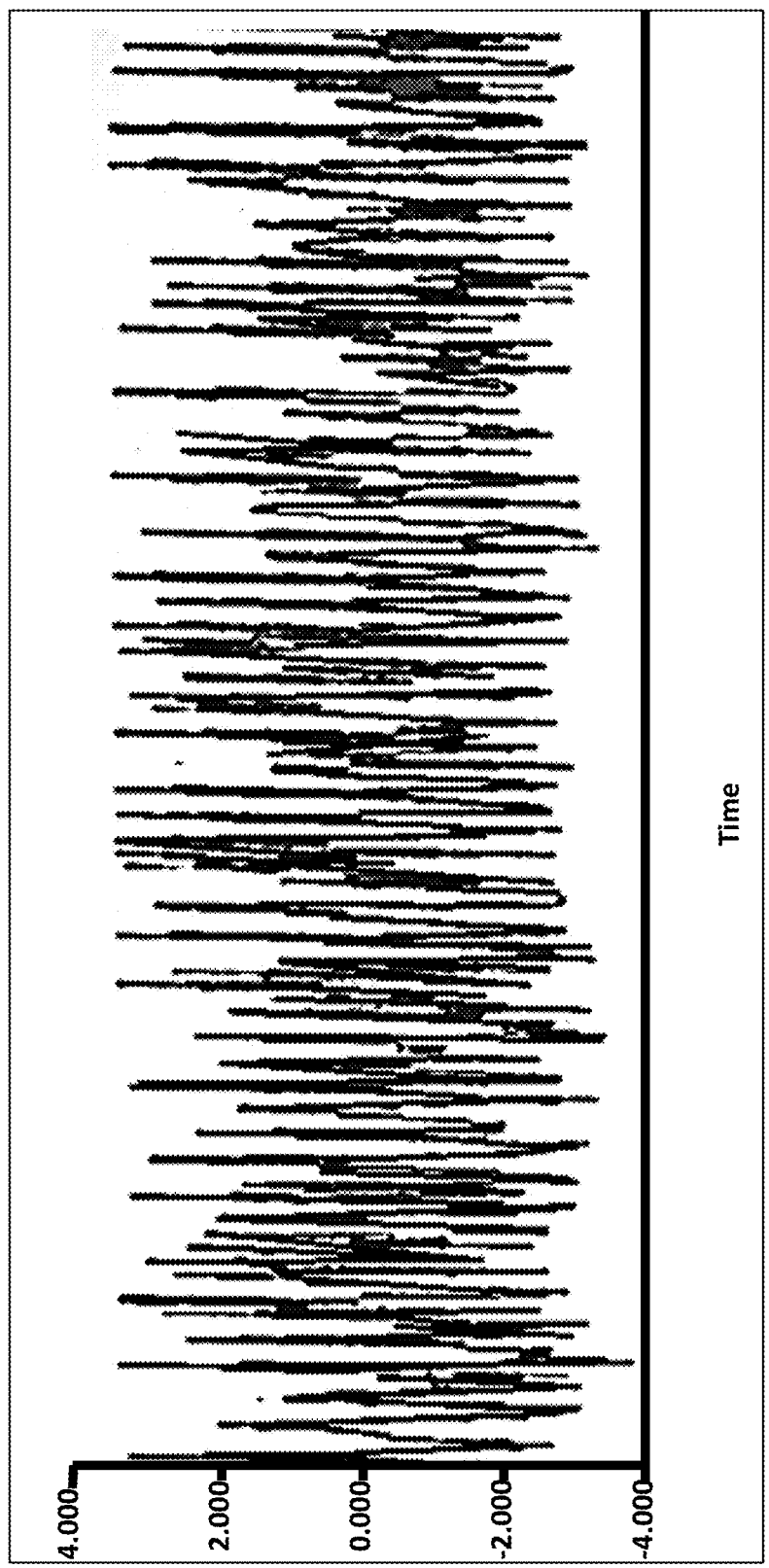
FIG. 5 is a plot of torque transients caused by print bounce without a torque assist command signal activated in the control of the drive of the motor of an exemplary roll, wherein the plot shows following error disturbance in thousandths of inches (y-axis) over time (x-axis).
Figure 6:
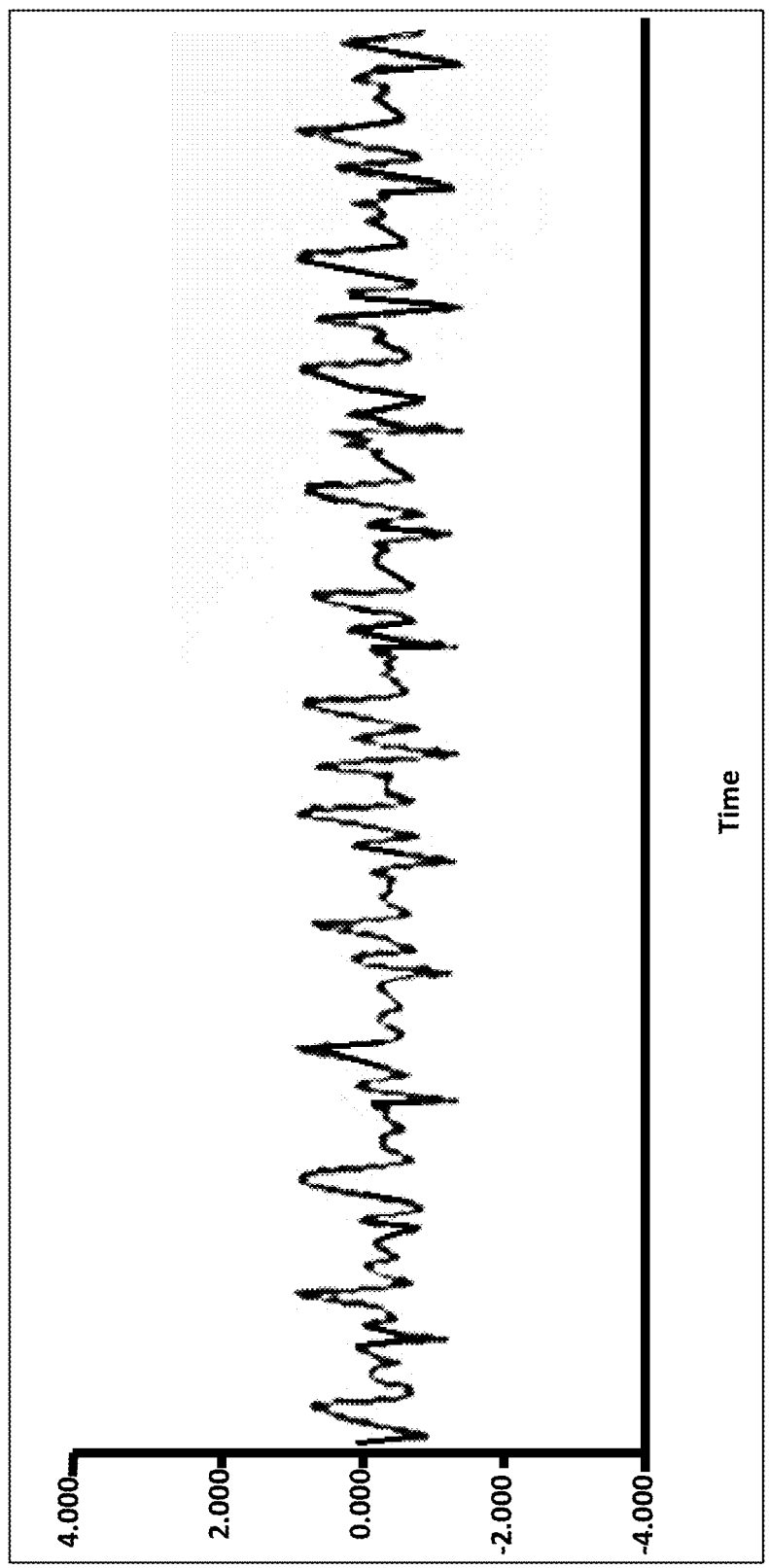
FIG. 6 is a plot of torque transients caused by print bounce with a torque assist command activated in the control of the drive of the motor of the exemplary roll of FIG. 5 wherein the plot shows following error disturbance in thousandths of inches (y-axis) over time (x-axis).

FIGS. 5 and 6 present plots that show the difference when an additive torque command is applied to the control 30 of the drive of the drive motor DM of the respective roll AR, PR. FIG. 5 shows a torque profile when the control 30 is configured to not apply an additive torque command to the motor control signal. FIG. 6 shows the torque profile when the control 30 is configured to apply an additive torque command to the motor control signal. As shown in FIG. 6, the peak to peak torque transient is reduced when the additive torque command is applied to the control 30 of the drive of the drive motor DM of the respective roll.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A printing press comprising:
   front and back frames,
   a front bearing assembly housed in a front bearing block, the front bearing block being operatively supported by the front frame,
   a back bearing assembly housed in a back bearing block, the front bearing block being operatively supported by the back frame,
   an elongated roll extending axially between the front and back frames, the roll having front and back ends which are rotatably supported by the front and back bearing assemblies, the roll having a center axis along its length, the roll comprising one of an anilox roll and a plate roll, and
   at least one of the front bearing assembly and the back bearing assembly comprising first and second bearings, the first and second bearings each having a support within the respective bearing block, the first bearing support being fixedly mounted relative to the respective bearing assembly within the respective bearing block, the second bearing support being movable independently relative to the first bearing support within the respective bearing block in a manner such that the second bearing engages the respective end of the roll with a radial load relative to the center axis of the roll.

2. The press of claim 1 wherein both the front and back bearing assemblies comprise the first and the second bearings.

3. The press of claim 1 wherein the second bearing support is movable in a linear direction relative to the first bearing support.

4. The press of claim 3 wherein the respective bearing assembly includes a lever actuator configured to move the second bearing support relative to the first bearing support.

5. The press of claim 4 wherein the lever actuator comprises a set screw to adjust the movement of the second bearing support relative to the first bearing support.

6. The press of claim 1 wherein the second bearing support is pivotable relative to the first bearing support.

7. The press of claim 6 wherein the respective bearing assembly includes a spring actuator configured to bias the second bearing support relative to the first bearing support.

8. The press of claim 7 wherein the spring actuator is adjustable to adjust the bias of the second bearing support relative to the first bearing support.

9. The press of claim 1 wherein the front bearing assembly comprises the first and second bearings, the front bearing assembly is movably mounted on the front frame between a first position in which the front bearing assembly rotatably supports the front end of the roll and a second position in which the front bearing assembly does not support the front end of the roll, and in the second position, the front bearing assembly first and second bearings are configured to disengage from the front end of the roll.

10. The press of claim 1 wherein the second bearing support engages the respective end of the roll with a radial load relative to the center axis of the roll that is opposite of the radial load of the first bearing support.

11. A printing press comprising:
    front and back frames,
    a front bearing assembly housed in a front bearing block, the front bearing block being supported on the front frame, a back bearing assembly housed in a back bearing block, the back bearing block being supported on the back frame, an elongated roll extending axially between the front and back frames, the roll having front and back ends which are rotatably supported by the front and back bearing assemblies, the roll having a center axis along its length, the roll comprising one of an anilox roll and a plate roll, and at least one of the front bearing assembly and the back bearing assembly comprising first and second bearings, the first and second bearings being adjacent to one another within the respective bearing block and each having a bearing support, the first bearing support being fixedly mounted in the respective bearing assembly relative to the roll center axis to provide a first radial load on the respective end of the roll within the respective bearing block, the second bearing support being movable independently relative to the first bearing support within the respective bearing block relative to the roll center axis to provide a second radial load on the respective end of the roll, the second radial load being opposite the first radial load.

12. The press of claim 11 wherein both the front and back bearing assemblies comprise the first and the second bearings.

13. The press of claim 11 wherein the second bearing support is movable in a linear direction relative to the first bearing support.

14. The press of claim 13 wherein the respective bearing assembly includes a lever actuator configured to move the second bearing support relative to the first bearing support.

15. The press of claim 14 wherein the lever actuator comprises a set screw to adjust the movement of the second bearing support relative to the first bearing support.

16. The press of claim 11 wherein the second bearing support is pivotable relative to the first bearing support.

17. The press of claim 16 wherein the respective bearing assembly includes a spring actuator configured to bias the second bearing support relative to the first bearing support.

18. The press of claim 17 wherein the spring actuator is adjustable to adjust a level of the bias of the second bearing support relative to the first bearing support.

19. The press of claim 11 wherein the front bearing assembly comprises the first and second bearings, the front bearing assembly is movably mounted on the front frame between a first position in which the front bearing assembly rotatably supports the front end of the roll with the first and second bearings applying radially opposite loading to the front end of the roll, and a second position in which the front bearing assembly does not support the front end of the roll and the first and second bearings of the front bearing assembly disengage from the front end of the roll.

* * * * *